C. C. MYERS.
Corn-Planter.

No. 58,876. Patented Oct. 16. 1866.

Witnesses:

Inventor:

UNITED STATES PATENT OFFICE.

CARLISLE C. MYERS, OF STERLING, ILLINOIS.

IMPROVEMENT IN CORN-PLANTERS.

Specification forming part of Letters Patent No. 58,876, dated October 16, 1866.

*To all whom it may concern:*

Be it known that I, CARLISLE C. MYERS, of Sterling, in the county of Whiteside and State of Illinois, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1:
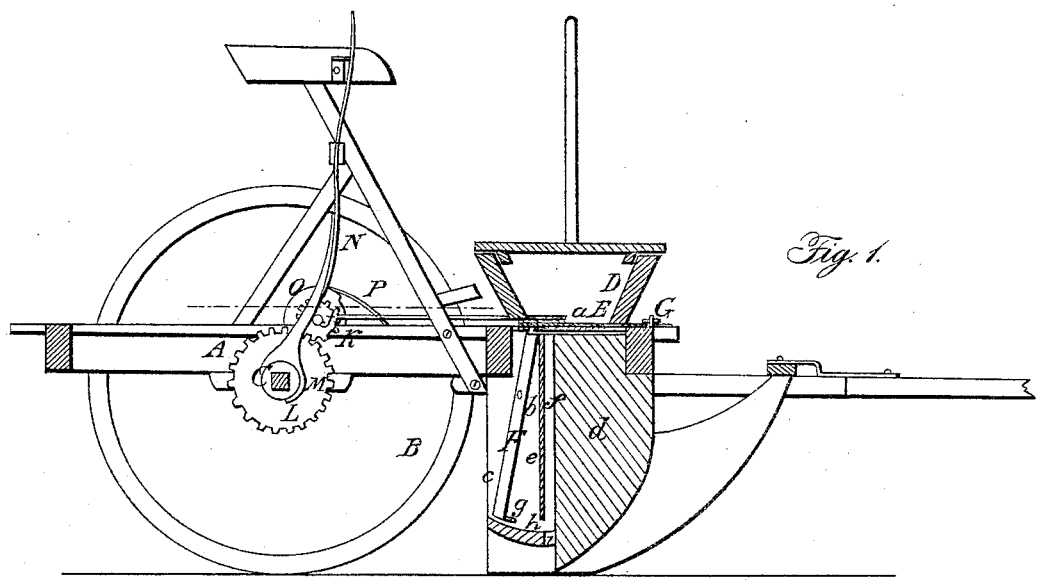
Figure 2:
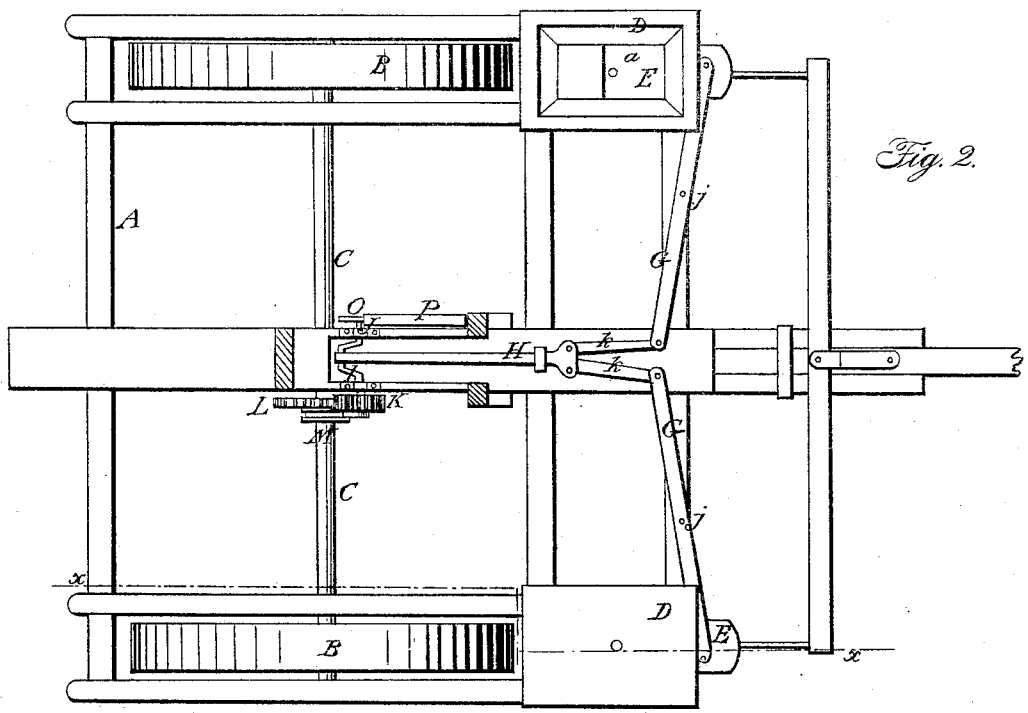

Figure 1 is a side sectional view of my invention, taken in the line $x$ $x$, Fig. 2; Fig. 2, a plan or top view of the same.

Similar letters of reference indicate corresponding parts.

This invention relates to a new and improved corn-planter of that class which are commonly termed "self-dropping;" and it consists in a novel seed-dropping mechanism, arranged as hereinafter set forth, whereby the corn may be planted in check-rows without the necessity of previously furrowing the ground in one direction.

A represents the frame of the machine, which is of rectangular form, and mounted on two wheels, B B, which are keyed on separate or independent axles C C, placed in line with each other, and having their inner ends fitted in one and the same bearing.

On the front part of the frame A there are placed two seed-boxes, D D, one at each side, in the lower parts of which there are slides E E—one in each box—said slides having a longitudinal position with the frame A, or working in that direction.

The slides E have each a hole, $a$, made in them, and the inner end of each slide is connected to the upper end of a lever, F. These levers F work on fulcrum-pins $b$ between vertical plates $c$, attached to the rear of pendants $d$, which are secured to frame A, said levers being behind vertical plates $e$, which form seed-conveying tubes $f$, between the plates $c$, directly behind the pendants $d$. (See Fig. 1.)

The lower ends of the levers F are provided with lips $g$, which work over segment-bottoms $h$ between the plates $c$, said bottoms having a hole, $i$, in them at the bottoms of the tubes $f$, as shown in Fig. 1.

The front ends of the slides E E are connected to the upper ends of levers G G, which work on fulcrum-pins $j$ on the front part of the frame A, and have their inner ends connected by links $k$ $k$ with a pitman, H, which is attached to a crank, I, on a small shaft, J. This shaft J has a pinion, K, on one end of it, which gears into a toothed wheel, L, placed loosely on one of the axles, and connected to it by a clutch, M, which is operated by a lever, N. On the opposite end of shaft J there is a cam, O, on which a spring, P, bears to form a click.

From the above description it will be seen that as the device is drawn along a reciprocating motion will be communicated to the slides E E and the seed distributed from the seed-boxes D D, the holes $a$ in said slides passing under cut-off plates $b^\times$ when arriving over the tubes $f$. The lips $g$ close the lower ends of the tubes $f$ when the seed is discharged into the same, and when the slides E are moved forward and the holes $a$ pass in front of the cut-off plates $b^\times$, to be filled, the lips $g$ at the lower ends of the levers are moved back, and admit of the discharge of the seed into the furrows made by the shares $h$.

Thus it will be seen that the seed or corn is discharged near the surface of the ground, and consequently will be quickly dropped, so as to insure the even planting of the corn in check-rows.

The click formed by the cam O and spring P serves to give warning to the driver of the position of the parts, and to enable him to drop the corn in range with previous rows in commencing rows from the ends of the fields, the covers of the seed-boxes D D being provided with upright stakes, and stakes being driven in the field at the first droppings in order to effect this result.

The seed-dropping mechanism may be rendered inoperative at any time by disconnecting the wheel L from its axle C by means of the lever N and clutch M.

Having thus described my invention, I claim as new and desire to secure by Letters Patent—

The levers F, provided with lips $g$, mounted upon the outside of the tubes $f$, and operating in connection therewith and with the slides E, as and for the purpose set forth.

CARLISLE C. MYERS.

Witnesses:
FREDERICK SACKETT,
E. G. ALLEN.